(12) United States Patent
Sinclair et al.

(10) Patent No.: US 8,864,975 B2
(45) Date of Patent: *Oct. 21, 2014

(54) INTEGRATED HYDROPROCESSING WITH HIGH PRODUCTIVITY CATALYSTS

(75) Inventors: Darden Sinclair, Beaumont, TX (US); Michel Daage, Hellertown, PA (US); Charles J. Mart, Baton Rouge, LA (US); Louis Burns, Baton Rouge, LA (US); Timothy L. Hilbert, Fairfax, VA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 1020 days.

This patent is subject to a terminal disclaimer.

(21) Appl. No.: 12/157,968

(22) Filed: Jun. 13, 2008

(65) Prior Publication Data

US 2008/0314797 A1    Dec. 25, 2008

Related U.S. Application Data

(60) Provisional application No. 60/934,533, filed on Jun. 13, 2007.

(51) Int. Cl.
| | |
|---|---|
| C10G 73/02 | (2006.01) |
| C10G 45/62 | (2006.01) |
| C10G 65/08 | (2006.01) |
| B01J 29/74 | (2006.01) |
| B01J 29/03 | (2006.01) |
| B01J 29/04 | (2006.01) |
| C10G 65/04 | (2006.01) |
| B01J 35/00 | (2006.01) |
| B01J 21/06 | (2006.01) |
| B01J 37/00 | (2006.01) |
| B01J 23/44 | (2006.01) |

(52) U.S. Cl.
CPC .......... *C10G 65/043* (2013.01); *C10G 2400/10* (2013.01); *C10G 2300/304* (2013.01); *B01J 21/063* (2013.01); *C10G 2300/302* (2013.01); *C10G 45/62* (2013.01); *C10G 65/08* (2013.01); *B01J 29/7461* (2013.01); *B01J 37/0009* (2013.01); *B01J 29/0325* (2013.01); *B01J 29/043* (2013.01); *C10G 73/02* (2013.01); *B01J 2229/20* (2013.01); *C10G 2300/4018* (2013.01); *B01J 35/0026* (2013.01); *B01J 2229/42* (2013.01); *B01J 23/44* (2013.01); *C10G 2300/301* (2013.01)
USPC .................. 208/28; 208/27; 208/49; 585/802

(58) Field of Classification Search
USPC .................................. 208/27, 28, 49; 585/802
See application file for complete search history.

(56) References Cited

U.S. PATENT DOCUMENTS

| | | | | |
|---|---|---|---|---|
| 4,497,909 | A | * | 2/1985 | Itoh et al. ...................... 502/262 |
| 5,075,269 | A | * | 12/1991 | Degnan et al. ................. 502/77 |
| 5,951,848 | A |   | 9/1999 | Baker et al. |
| 6,096,189 | A |   | 8/2000 | Cody et al. |
| 6,231,749 | B1 | * | 5/2001 | Degnan et al. ................. 208/58 |
| 6,923,949 | B1 | * | 8/2005 | Lai et al. ...................... 423/709 |
| 7,482,300 | B2 | * | 1/2009 | Lai et al. ........................ 502/60 |
| 7,625,478 | B2 | * | 12/2009 | Lai et al. ........................ 208/28 |
| 2003/0017937 | A1 | * | 1/2003 | Ihm et al. ....................... 502/66 |
| 2003/0062292 | A1 | * | 4/2003 | Hantzer et al. ................. 208/58 |
| 2003/0168379 | A1 |   | 9/2003 | Degnan et al. |
| 2004/0108247 | A1 | * | 6/2004 | Cody et al. .................... 208/27 |
| 2004/0108249 | A1 | * | 6/2004 | Cody et al. .................... 208/89 |
| 2006/0011514 | A1 | * | 1/2006 | van den Berge et al. ....... 502/67 |
| 2006/0065575 | A1 | * | 3/2006 | Benard et al. .................. 208/58 |
| 2006/0102518 | A1 |   | 5/2006 | Moureaux et al. |

FOREIGN PATENT DOCUMENTS

WO        2004033597 A2    4/2004

* cited by examiner

*Primary Examiner* — Michelle Stein
(74) *Attorney, Agent, or Firm* — Robert A. Migliorini

(57) ABSTRACT

Integrated hydroprocessing methods using high activity, low density catalysts are provided. The high activity catalysts allow for lower temperature operation, which reduces catalyst degradation, while the low density of the catalysts means a corresponding reduction in the amount of metal needed to fill a reactor volume. The methods allow for flexible processing of feedstocks with a variety of wax contents.

10 Claims, 10 Drawing Sheets

FIG 7 - 370C+ Pour Point @ 2LHSV vs Temperature

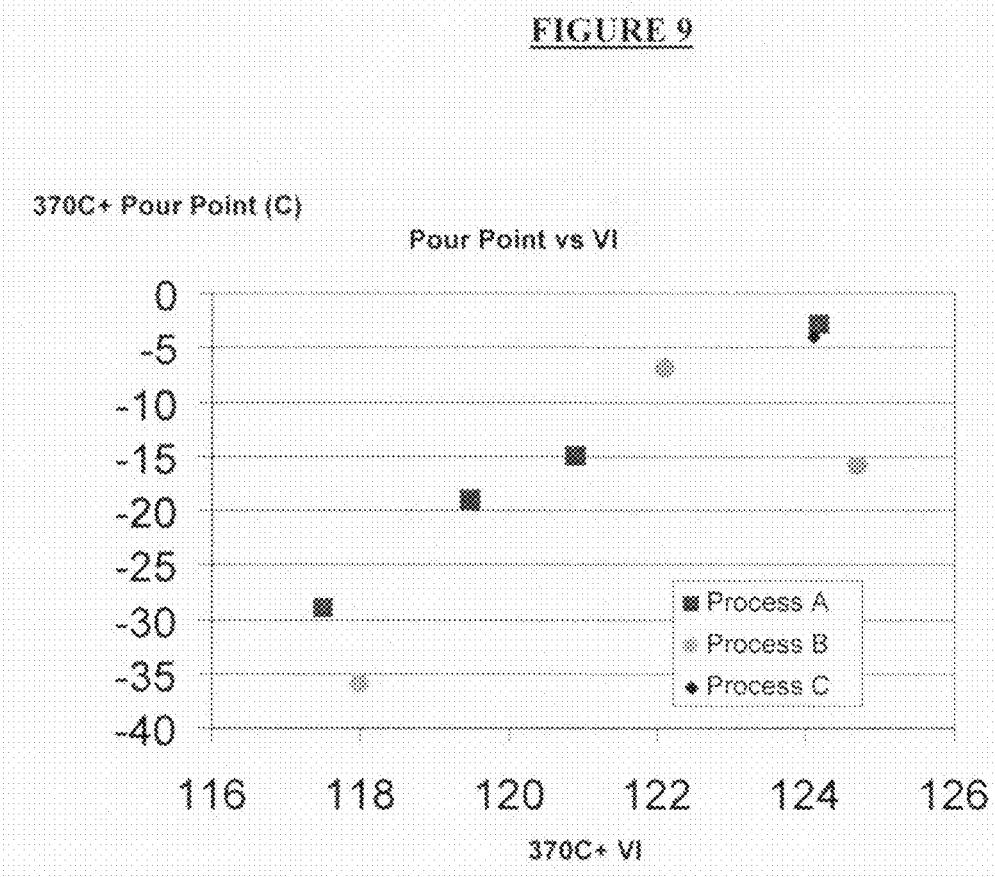

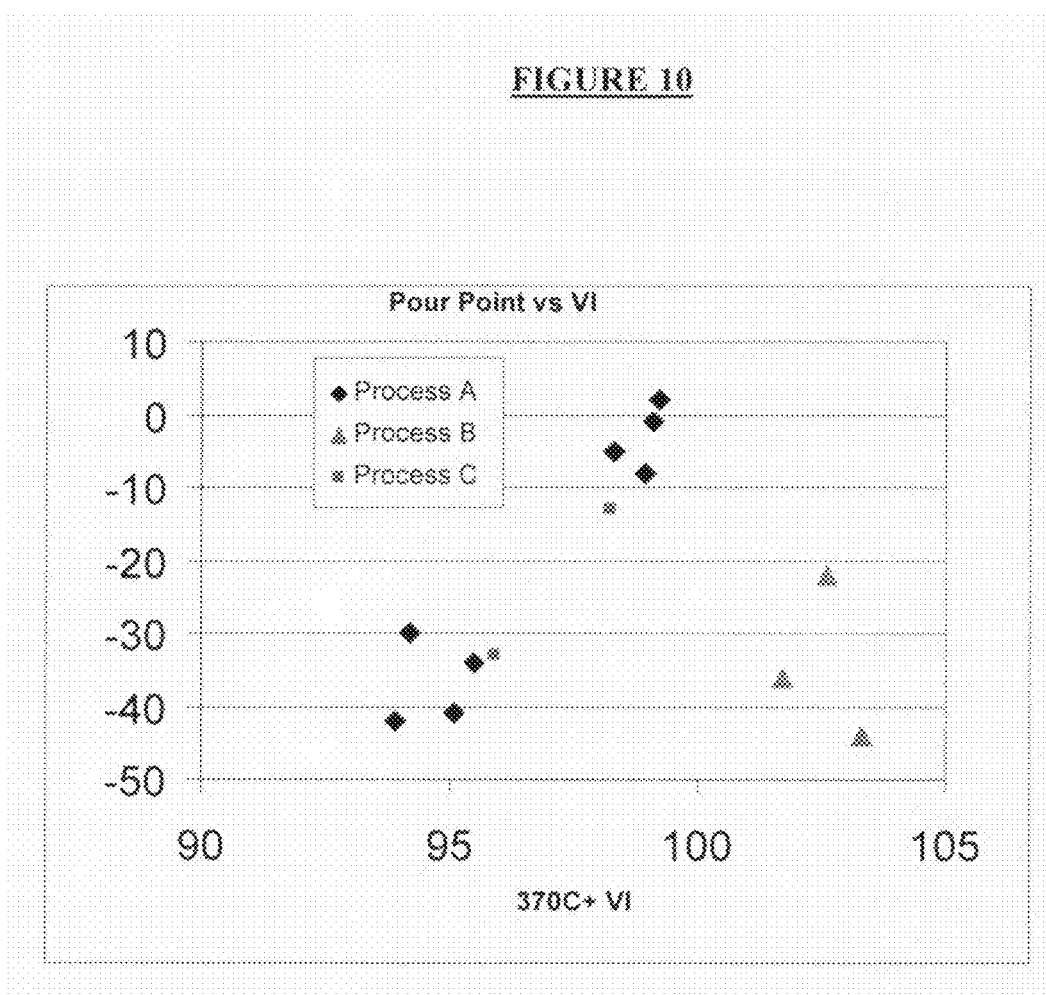

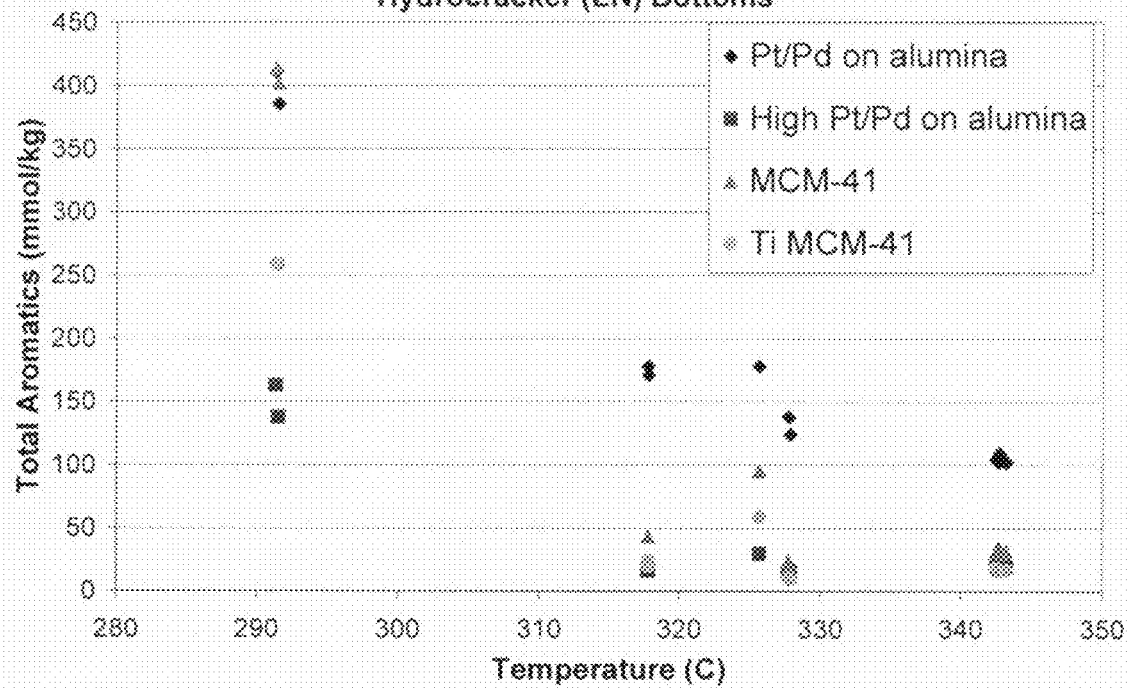

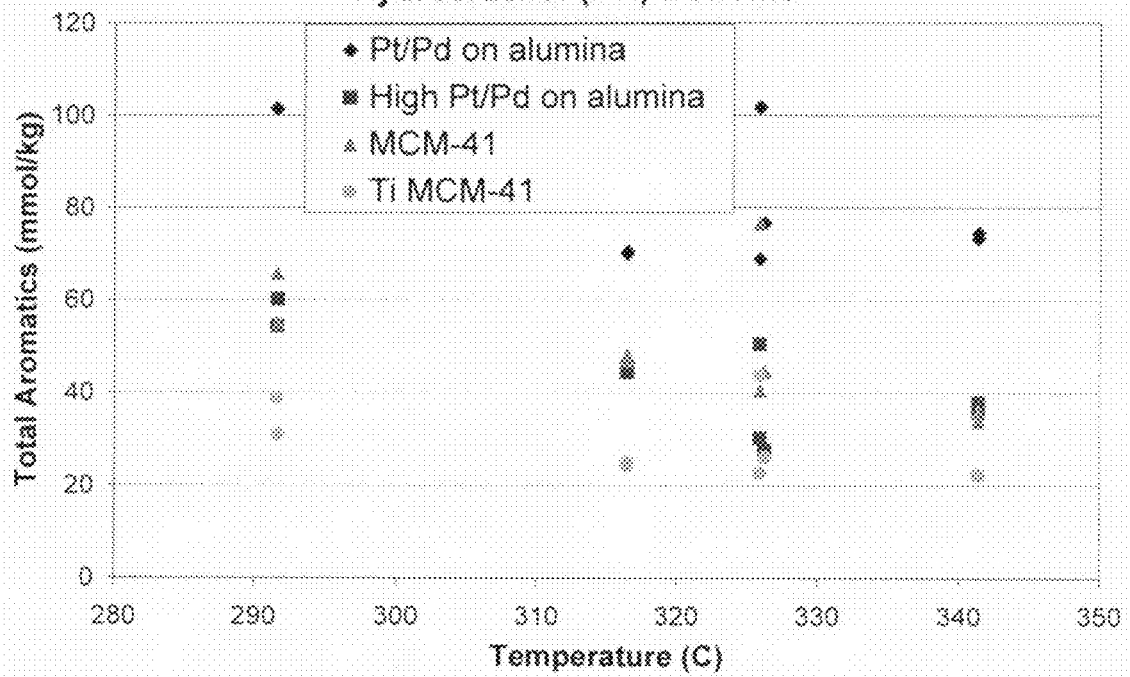

INTEGRATED HYDROPROCESSING WITH HIGH PRODUCTIVITY CATALYSTS

This application claims the benefit of Provisional Application 60/934,533 filed Jun. 13, 2007.

FIELD OF THE INVENTION

This invention relates to methods for catalytic hydroprocessing of feedstocks.

BACKGROUND OF THE INVENTION

Catalytic hydroprocessing of distillate or lube oil boiling range feedstocks typically involves use of a catalyst having supported Group VIII and/or Group VI metals. In many situations, the supported metals represent a substantial portion of the cost of the catalyst. Due to the large volume of catalyst required to load a typical hydroprocessing reactor, lower cost catalysts are a desirable feature for any refinery.

U.S. Pat. No. 5,951,848 provides a method for treating a hydrocarbon feedstock by first exposing the feedstock to a high activity hydrotreating catalyst to reduce the levels of, for example, nitrogen, sulfur, and aromatics. The hydrotreated feed is then dewaxed using a dewaxing catalyst, such as ZSM-23, ZSM-35, or ZSM-48.

What is needed is an improved method for hydroprocessing of hydrocarbon feedstocks that provides reduced cost of operation.

SUMMARY OF THE INVENTION

In an embodiment, the invention provides a method for producing a lube basestock. The method includes providing a first catalyst comprising at least one Group VIII metal supported on a catalyst support and having a density of 600 kg/m$^3$ or less. A second catalyst is provided that includes at least one Group VIII metal. The second catalyst is selected to have a sufficient dewaxing productivity to satisfy a test regarding processing of a light neutral (150N) hydrocarbon stream produced from a medium pressure hydrocracker, the light neutral hydrocarbon stream having a kinematic viscosity at 100° C. of less than 5 and a boiling point of less than 550. The second catalyst has sufficient activity at 320° C. and 1 LHSV to produce a lube basestock having pour point less than −15° C. and a VI of at least 160. A feedstock is exposed to the first catalyst under effective conditions for treating the feedstock, said effective conditions being effective for one of hydrotreating, hydrofinishing, or aromatic saturation. The treated feedstock is then exposed to the second catalyst under conditions effective for dewaxing the treated feedstock.

In another embodiment, the invention provides a method for producing a lube basestock. The method includes exposing a feedstock to a first catalyst, said first catalyst comprising at least one Group VIII metal supported on a catalyst support and having a density of 600 kg/m$^3$ or less, under effective conditions for treating the feedstock, said effective conditions being effective for one of hydrotreating, hydrofinishing, or aromatic saturation. The treated feedstock is then exposed to a catalyst comprising ZSM-48 having a SiO$_2$:Al$_2$O$_3$ ratio of from about 70 to about 110 and a metal hydrogenation component under conditions effective for dewaxing the treated feedstock.

In still another embodiment, the invention provides a method for producing lubricating oil basestocks. The method includes providing a process train including a first catalyst that is a hydrotreating, hydrofinishing, or aromatic saturation catalyst, and a second catalyst that is a dewaxing catalyst. A first feedstock having a first wax content is processed in the process train at a first temperature to produce a basestock having a pour point less than about −15° C., the first temperature being 365° C. or less. A second feedstock having a second wax content is processed in the same process train at a temperature within 30° C. of the first temperature, the second wax content being at least 30 wt % higher than the first wax content, to produce a second basestock having a pour point less than about −15° C.

BRIEF DESCRIPTION OF THE DRAWINGS

FIGS. 9 and 10 show pour point versus viscosity index for feedstocks processed consecutively with various hydroprocessing catalysts.

FIGS. 11 and 12 show the difference in aromatic saturation for processing of feedstocks with various aromatic saturation catalysts.

DETAILED DESCRIPTION OF THE EMBODIMENTS

Figure 1:
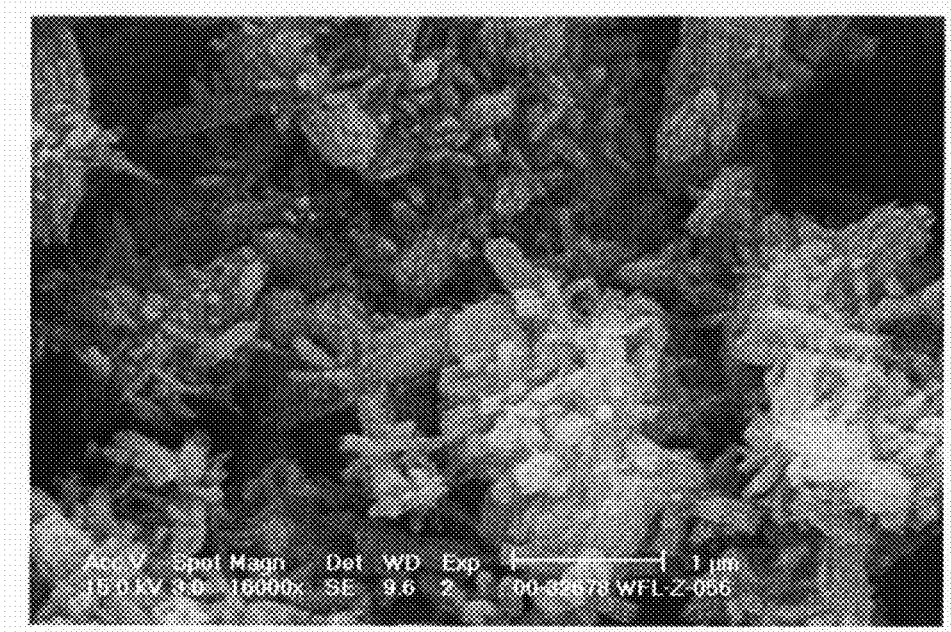
FIG. 1 is a photomicrograph of ZSM-crystals prepared at a template:silica ratio of 0.023 and showing the presence of some needle like crystals.

The invention provides a method for hydroprocessing hydrocarbon feedstocks that provides increased flexibility and/or reduced costs of operation. The method involves using high productivity and/or low density hydroprocessing catalysts, such as hydrotreating, hydrofinishing, or hydrodewaxing catalysts, for hydroprocessing of a hydrocarbon feed. The inventive method provides for reduced cost of operations in three separate ways.

First, the use of high productivity catalysts according to the invention leads to reduced costs. A catalyst with higher productivity can achieve the same effect as a catalyst with lower productivity with a reduced amount of catalyst. The reduced amount of catalyst required means that less catalyst is needed each time the reactor is loaded, leading to cost savings. Alternatively, a catalyst with higher productivity can be used to perform a process at a lower temperature. Due to catalyst degradation, the temperature in many hydroprocessing reactors needs to be increased during operation in order to maintain a desired activity level. When the catalyst becomes sufficiently degraded that the required temperature is above a desired threshold, the catalyst is replaced. Performing a reaction at lower temperature can extend the lifetime between catalyst replacement operations in two separate ways. Operating at a lower temperature typically reduces the amount of degradation of a catalyst. Additionally, as a catalyst starts to degrade, the lower initial operating temperature means that a larger temperature range is available to counteract the catalyst degradation while minimizing other side effects. Thus, operating at a lower temperature allows for reduced frequency of reaction unit shutdowns, which also leads to lower costs.

Second, the use of low density catalysts according to the invention provides for reduced costs through reductions in the amount of metal loaded onto catalyst. Metal loadings on catalyst are typically characterized in terms of the amount of metal per weight of catalyst. When a low density catalyst is used, less metal is needed to achieve a desired amount of metal per weight of catalyst. Thus, the use of low density catalysts reduces the overall metal content present in a catalyst bed, which leads to lower costs.

Finally, the high productivity, low density catalysts used in the invention allow for "blocking" of feedstocks in a reaction unit. Typically, a process train is used to treat a specific feedstock. Changing the type of feedstock to be treated requires modification of the process train. Using the catalysts according to the invention, different types of feedstocks can be processed in a reaction unit, with either no change in operating conditions, or only a change in the temperature of the process train. This type of "blocking" of feedstocks allows greater flexibility in making use of a process train, as the feedstock introduced into the process train can be changed without modifying equipment or otherwise incurring significant down time.

Selection of High Productivity and Low Density Catalysts

High productivity catalysts refer to catalysts which have a relatively high reaction rate per unit volume for a desired reaction, such as hydrotreating, hydrodewaxing, hydrofinishing, or aromatic saturation. Low density catalysts refer to catalysts which have relatively lower total weight per unit volume.

In various embodiments, the invention employs high productivity hydrotreating catalysts. These hydrotreating catalysts can be characterized by a hydrotreating activity "k", which is a rate constant for the removal of sulfur or nitrogen from a feedstock with specified levels of sulfur and nitrogen. This rate constant is defined on a volumetric basis, to allow for comparison between catalysts.

In other embodiments, the invention employs high productivity hydrofinishing and/or aromatic saturation catalysts. For hydrofinishing or aromatic saturation catalysts, productivity can be defined in terms of the treatment temperature required to achieve a desired level of aromatic removal for a specified feed at a specified ratio of feedstock velocity per amount of catalyst.

Dewaxing catalysts represent another type of catalyst that can be characterized based on productivity. Dewaxing catalysts often affect several characteristics of a feedstock at the same time. Thus, characterizing a dewaxing catalyst as "high productivity" requires simultaneous consideration of several variables. The following test is adopted in this invention to characterize the productivity of a dewaxing catalyst:

A high productivity catalyst for dewaxing is defined as a catalyst which produces the following results when processing a light neutral (150N) feedstock produced from a medium pressure hydrocracker having a kinematic viscosity at 100C of less than 5 and a boiling point of less than 550 F. The feedstock is processed at 320° C. and a LHSV of 1 in the presence of the hydroprocessing catalyst to produce a dewaxed basestock with the following properties:

| | |
|---|---|
| Pour point: | Less than −15° C. |
| Conversion: | at least 20 wt % |
| VI: | at least 160 |

In other embodiments, the invention employs low density hydroprocessing catalysts. In this invention, the catalyst density refers to the catalyst density for multiple catalyst particles in a vessel. This is in contrast to the density of an individual catalyst particle. The density of catalyst particles in a vessel will be lower than the density of an individual catalyst particle due to void spaces between adjacent catalyst particles. In an embodiment, the catalyst density is less than 600 kg/m$^3$ (0.6 g/cm$^3$), or less than 590 kg/m$^3$, or less than 580 kg/m$^3$, or less than 570 kg/m$^3$, or less than 550 kg/m$^3$, or less than 525 kg/m$^3$, or less than 500 kg/m$^3$, or less than 475 kg/m$^3$.

Hydroprocessing Catalysts—General

In an embodiment, one or more of the hydroprocessing catalysts can be catalysts suitable for hydrotreatment, hydrofinishing, and/or aromatic saturation of a feedstock. In such an embodiment, the catalyst can be composed of one or more Group VIII and/or Group VI metals on a support. Suitable metal oxide supports include low acidic oxides such as silica, alumina, silica-aluminas or titania. The supported metals can include Co, Ni, Fe, Mo, W, Pt, Pd, Rh, Ir, or a combination thereof. Preferably, the supported metal is Pt, Pd, or a combination thereof. The amount of metals, either individually or in mixtures, ranges from about 0.1 to 35 wt. %, based on the catalyst. In an embodiment, the amount of metals, either individually or in mixtures, is at least 0.1 wt %, or at least 0.25 wt %, or at least 0.5 wt %, or at least 0.6 wt %, or at least 0.75 wt %, or at least 1 wt %. In another embodiment, the amount of metals, either individually or in mixtures, is 35 wt % or less, or 20 wt % or less, or 15 wt % or less, or 10 wt % or less, or 5 wt % or less. In preferred embodiments wherein the supported metal is a noble metal, the amount of metals is typically less than 1 wt %. In such embodiments, the amount of metals can be 0.9 wt % or less, or 0.75 wt % or less, or 0.6 wt % or less. The amounts of metals may be measured by methods specified by ASTM for individual metals including atomic absorption spectroscopy or inductively coupled plasma-atomic emission spectrometry.

In a preferred embodiment, the hydrotreating, hydrofinishing, or aromatic saturation catalyst is a Group VIII and/or Group VI metal supported on a bound support from the M41S family, such as bound MCM-41. The M41S family of catalysts are mesoporous materials having high silica contents whose preparation is further described in J. Amer. Chem. Soc., 1992, 114, 10834. Examples included MCM-41, MCM-48 and MCM-50. Mesoporous refers to catalysts having pore sizes from 15 to 100 Angstroms. A preferred member of this class is MCM-41 whose preparation is described in U.S. Pat. No. 5,098,684. MCM-41 is an inorganic, porous, non-layered phase having a hexagonal arrangement of uniformly-sized pores. The physical structure of MCM-41 is like a bundle of straws wherein the opening of the straws (the cell diameter of the pores) ranges from 15 to 100 Angstroms. MCM-48 has a cubic symmetry and is described for example is U.S. Pat. No. 5,198,203 whereas MCM-50 has a lamellar structure. MCM-41 can be made with different size pore openings in the mesoporous range. Suitable binders for the MCM-41 can include Al, Si, or any other binder or combination of binders that provides a high productivity and/or low density catalyst. An example of a high productivity aromatic saturation catalyst that is also a low density catalyst is Pt on alumina bound mesoporous MCM-41. Alumina bound MCM-41 can be synthesized with a catalyst density that is less than 600 kg/m$^3$ (0.6 g/cm³), or less than 590 kg/m³, or less than 580 kg/m³, or less than 560 kg/m³, or less than 550 kg/m³ or less than 540 kg/m³, or less than 525 kg/m³, or less than 500 kg/m³, or less than 475 kg/m³. Such a catalyst can be impregnated with a hydrogenation metal such as Pt, Pd, another Group VIII metal, a Group VI metal, or a mixture of metals thereof. In an embodiment, the amount of Group VIII metal is at least 0.1 wt. % per weight of catalyst. Preferably, the amount of Group VIII metal is at least 0.5 wt. %, or at least 0.6 wt. %. In such embodiments, the amount of metals can be 1.0 wt % or less, or 0.9 wt % or less, or 0.75 wt % or less, or 0.6 wt % or less. In still other embodiments, the amount of metals, either individually or in mixtures, is at least 0.1 wt %, or at least 0.25 wt %, or at least 0.5 wt %, or at least 0.6 wt %, or at least 0.75 wt %, or at least 1 wt %. In yet other embodiments, the amount of metals, either individually or in mixtures, is 35 wt % or less, or 20 wt % or less, or 15 wt % or less, or 10 wt % or less, or 5 wt % or less.

Dewaxing Catalyst—ZSM-48

One example of a dewaxing catalyst suitable for use in the claimed invention is ZSM-48 with a $SiO_2:Al_2O_3$ ratio of less than 110, preferably from is about 70 to about 110. In a preferred embodiment, the ZSM-48 with the $SiO_2:Al_2O_3$ ratio of less than 110 is free of a non-ZSM-48 seed crystals. Preferably, the high purity ZSM-48 crystals are also free of ZSM-50.

In the embodiments below, ZSM-48 crystals will be described variously in terms of "as-synthesized" crystals that still contain the organic template; calcined crystals, such as Na-form ZSM-48 crystals; or calcined and ion-exchanged crystals, such as H-form ZSM-48 crystals.

By "free of non-ZSM-48 seed crystals" is meant that the reaction mixture used for forming the ZSM-48 crystals does not contain non-ZSM-48 seed crystals. Instead, ZSM-48 crystals synthesized according to the invention are either synthesized without the use of seed crystals, or with ZSM-48 seed crystals for seeding. By "free of Kenyaite and ZSM-50" is meant that Kenyaite ZSM-50, if any, are present in amounts that are not detectable by X-ray diffraction. Preferably, the ZSM-48 used in the invention is also free of other non-ZSM-48 crystals to the degree that such other crystals are also not detectable by X-ray diffraction. This non-detectable determination can be made on a Bruker D4 Endeavor instrument, manufactured by Bruker AXS, and equipped with a Vantec-1 high-speed detector. The instrument is run using a silicon powder standard (Nist 640B) which is a material without stress. The full-width half-maximum (fwhm) for the standard peak at 28.44 degrees 2 theta is 0.132. The step size is 0.01794 degrees and the time/step is 2.0 seconds. The 2 theta scan used a Cu target at 35 kv and 45 ma. By "free of fibrous crystals" and "free of needle-like crystals" is meant that the fibrous and/or needle-like crystals, if any, are present in amounts that are not detectable by Scanning Electron Microscopy (SEM). Photomicrographs from SEM can be used to identify crystals with different morphologies. The resolution scale (1 μm) is shown on is the photomicrographs in the present figures.

The X-ray diffraction pattern (XRD) of the ZSM-48 crystals suitable for use in the invention is that exhibited by ZSM-48, i.e., the D-spacings and relative intensities correspond to those of pure ZSM-48. While XRD can be used to establish the identity of a given zeolite, it cannot be used to distinguish a particular morphology. For example, the needle-like and platelet forms for a given zeolite will exhibit the same diffraction patterns. In order to distinguish between different morphologies, it is necessary to use an analytical tool with greater resolution. An example of such a tool is scanning electron microscopy (SEM). Photomicrographs from SEM can be used to identify crystals with different morphologies.

The ZSM-48 crystals after removal of the structural directing agent have a particular morphology and a molar composition according to the general formula:

$$(n)SiO_2:Al_2O_3$$

where n is from 70 to 110, preferably 80 to 100, more preferably 85 to 95. In another embodiment, n is at least 70, or at least 80, or at least 85. In yet another embodiment, n is 110 or less, or 100 or less, or 95 or less. In still other embodiments, Si may be replaced by Ge and Al may be replaced by Ga, B, Fe, Ti, V, and Zr.

The as-synthesized form of ZSM-48 crystals is prepared from a mixture having silica, alumina, base and hexamethonium salt directing agent. In an embodiment, the molar ratio of structural directing agent:silica in the mixture is less than 0.05, or less than 0.025, or less than 0.022. In another embodiment, the molar ratio of structural directing agent:silica in the mixture is at least 0.01, or at least 0.015, or at least 0.016. In still another embodiment, the molar ratio of structural directing agent:silica in the mixture is from 0.015 to 0.025, preferably 0.016 to 0.022. In an embodiment, the as-synthesized form of ZSM-48 crystals has a silica:alumina molar ratio of 70 to 110. In still another embodiment, the as-synthesized form of ZSM-48 crystals has a silica:alumina molar ratio of at least 70, or at least 80, or at least 85. In yet another embodiment, the as-synthesized form of ZSM-48 crystals has a silica:alumina molar ratio of 110 or less, or 100 or less, or 95 or less. For any given preparation of the as-synthesized form of ZSM-48 crystals, the molar composition will contain silica, alumina and directing agent. It should be noted that the as-synthesized form of ZSM-48 crystals may have molar ratios slightly different from the molar ratios of reactants of the reaction mixture used to prepare the as-synthesized form. This result may occur due to incomplete incorporation of 100% of the reactants of the reaction mixture into the crystals formed (from the reaction mixture).

The ZSM-48 zeolite in either a calcined or as-synthesized form typically forms agglomerates of small crystals that may have crystal sizes in the range of about 0.01 to about 1 μm. These small crystals are desirable for they generally lead to greater activity. Smaller crystals mean greater surface area which leads to a greater number of active catalytic sites per given amount of catalyst. Preferably, the ZSM-48 crystals in either a calcined or as-synthesized form have a morphology containing no fibrous crystals. By fibrous is meant crystals that have a L/D ratio of >10/1, where L and D represent the length and diameter of the crystal. In another embodiment, the ZSM-48 crystals in either a calcined or as-synthesized form have a low quantity or are free of needle-like crystals. By needle-like is meant crystals that have a L/D ratio of <10/1, preferably less than 5/1, more preferably between 3/1 and 5/1. The SEM shows that crystals prepared according to the methods herein have no detectable crystals having a fibrous or needle-like morphology. This morphology alone or coupled with the low silica:alumina ratios leads to catalysts having high activity as well as desirable environmental features.

The ZSM-48 composition is prepared from an aqueous reaction mixture comprising silica or silicate salt, alumina or soluble aluminate salt, base and directing agent. To achieve the desired crystal morphology, the reactants in reaction mixture have the following molar ratios:

$SiO_2:Al_2O_3$=70 to 110
$H_2O:SiO_2$=1 to 500
$OH^-:SiO_2$=0.1 to 0.3
$OH^-:SiO_2$ (preferred)=0.14 to 0.18 template:SiO$_2$=0.01-0.05
template:SiO$_2$ (preferred)=0.015 to 0.025

In the above ratios, two ranges are provided for both the base:silica ratio and the structure directing agent:silica ratio. The broader ranges for these ratios include mixtures that result in the formation of ZSM-48 crystals with some quantity of Kenyaite and/or needle-like morphology. For situations where Kenyaite and/or needle-like morphology is not desired, the preferred ranges should be used, as is further illustrated below in the Examples.

The silica source is preferably precipitated silica and is commercially available from Degussa. Other silica sources include powdered silica including precipitated silica such as Zeosil® and silica gels, silicic acid is colloidal silica such as Ludox® or dissolved silica. In the presence of a base, these other silica sources may form silicates. The alumina may be in the form of a soluble salt, preferably the sodium salt and is commercially available from US Aluminate. Other suitable aluminum sources include other aluminum salts such as the chloride, aluminum alcoholates or hydrated alumina such as gamma alumina, pseudobohemite and colloidal alumina. The base used to dissolve the metal oxide can be any alkali metal hydroxide, preferably sodium or potassium hydroxide, ammonium hydroxide, diquaternary hydroxide and the like. The directing agent is a hexamethonium salt such as hexamethonium dichloride or hexamethonium hydroxide. The anion (other than chloride) could be other anions such as hydroxide, nitrate, sulfate, other halide and the like. Hexamethonium dichloride is N,N,N,N',N',N'-hexamethyl-1,6-hexanediammonium dichloride.

In the synthesis of the ZSM-48 crystals, the reactants including silicate salt, aluminate salt, base and directing agent are mixed together with water in the ratios set forth above and heated with stirring at 100 to 250° C. The crystals may be formed from reactants or in the alternative, ZSM-48 seed crystals may be added to the reaction mixture. The ZSM-48 seed crystals may be added to enhance the rate of crystal formation but do not otherwise affect crystal morphology. The preparation is free of other non-ZSM-48 types of seed crystals such as zeolite Beta. The ZSM-48 crystals are purified, usually by filtration, and washed with deionized water.

In an embodiment, the crystals obtained from the synthesis according to the invention have a composition that is free of non ZSM-48 seed crystals and free of ZSM-50. Preferably, the ZSM-48 crystals will have a low quantity of Kenyaite. In an embodiment, the amount of Kenyaite can be 5% or less, or 2% or less, or 1% or less. In an alternative embodiment, the ZSM-48 crystals can be free of Kenyaite.

In an embodiment, the crystals obtained from the synthesis according to the invention have a morphology that is free of fibrous morphology. Fibrous morphology is not desired, as this crystal morphology inhibits the catalytic dewaxing activity of ZSM-48. In another embodiment, the crystals obtained from the synthesis according to the invention have a morphology that contains a low percentage of needle-like morphology. The amount of needle-like morphology present in the ZSM-48 crystals can be 10% or less, or 5% or less, or 1% or less. In an alternative embodiment, the ZSM-48 crystals can be free of needle-like morphology. Low amounts of needle-like crystals are preferred for some applications as needle-like crystals are believed to reduce the activity of ZSM-48 for some types of reactions. To obtain a desired morphology in high purity, the ratios of silica:alumina, base:silica and directing agent:silica in the reaction mixture according to embodiments of the invention should be employed. Additionally, if a composition free of Kenyaite and/or free of needle-like morphology is desired, the preferred ranges should be used.

According to U.S. Pat. No. 6,923,949, heterostructural, non-ZSM-48 seeding is used to prepare ZSM-48 crystals having a silica:alumina ratio less than 150:1. According to U.S. Pat. No. 6,923,949, the preparation of pure ZSM-48 with silica:alumina ratios down to 50:1 or less is dependent on the use of heterostructural seeds such as zeolite Beta seeds.

If heterogeneous seed crystals are not used, as one synthesizes ZSM-48 with increasingly lower silica:alumina ratios, the formation of the impurity ZSM-50 becomes more of a factor. Ratios of directing agent:silica greater than about 0.025 typically produce mixed phase aggregates containing needle-like crystals. Preferably, the ratio of directing agent:silica is about 0.022 or less. Ratios of directing agent: silica below about 0.015 begin to produce a product containing Kenyaite. Kenyaite is an amorphous layered silicate and is a form of natural clay. It does not exhibit zeolite type activity. Instead, it is relatively inert in the presence of reaction conditions typically present when a feedstock is exposed to ZSM-48. Thus, while the presence of Kenyaite in a ZSM-48 sample is tolerable in some applications, the presence of Kenyaite tends to reduce the overall activity of the ZSM-48. Ratios of hydroxide:silica (or other base:silica) and silica:alumina ratios are also important to the morphology of the crystals formed as well as to purity of crystals formed. Ratios of silica:alumina are also important to catalyst activity. The base:silica ratio is a factor affecting the formation of Kenyaite. The use of a hexamethonium directing agent is a factor for the production of a product not containing a fibrous material. The formation of needle-like morphology is a function of the silica:alumina ratio and structure directing agent:silica ratio.

The as-synthesized ZSM-48 crystals should be at least partially dried prior to use or further treatment. Drying may be accomplished by heating at temperatures of from 100 to 400° C., preferably from 100 to 250° C. Pressures may be atmospheric or subatmospheric. If drying is performed under partial vacuum conditions, the temperatures may be lower than those at atmospheric pressures Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel. The bound ZSM-48 may range from 10 to 100 wt. % ZSM-48, based on bound ZSM-48 with the balance being binder.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 to 5 wt. %, based on catalyst. In an embodiment, the amount of metal or metals is at least 0.1 wt %, or at least 0.25 wt %, or at least 0.5 wt %, or at least 0.6 wt %, or at least 0.75 wt %. In another embodiment, the amount of metal or metals is 5 wt % or less, or 4 wt % or less, or 3 wt % or less, or 2 wt % or less, or 1 wt % or less. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use. The catalyst may also be steamed prior to use.

High purity ZSM-48 crystals made according to the above embodiments have a relatively low silica:alumina ratio. This lower silica:alumina ratio mean that the present catalysts are more acidic. In spite of this increased acidity, they have superior activity and selectivity as well as excellent yields. They also have environmental benefits from the standpoint of health effects from crystal form and the small crystal size is also beneficial to catalyst activity.

In addition to the embodiments described above, in still another embodiment, the invention relates to high purity ZSM-48 composition having a silica:alumina molar ratio of from 70 to 110, the ZSM-48 being free of non-ZSM-48 seed crystals and fibrous crystals. Preferably, the ZSM-48 crystals also have a low content or are free of needle-like crystals. Another embodiment relates to a ZSM-48 crystals which in an as-synthesized form comprise ZSM-48 having a silica:alumina molar ratio of from 70 to 110 and are formed from a reaction mixture containing a hexamethonium directing agent in a hexamethonium:silica molar ratio from 0.01 to 0.05, preferably from 0.015 to 0.025. In this embodiment, the as-synthesized ZSM-48 crystals are free of non-ZSM-48 seed crystals and fibrous crystals. Preferably, the ZSM-48 crystals also have a low content of needle-like crystals or are free of needle-like crystals.

In still a further embodiment, the as-synthesized ZSM-48 crystals are calcined thereby removing the hexamethonium structure directing agent to form high purity Na-form ZSM-48. This Na-form ZSM-48 can also be ion exchanged to form H-form ZSM-48. In still another embodiment, the as-synthesized form of ZSM-48 crystals or the calcined ZSM-48 (Na-form or H-form) is combined with at least one of a binder and hydrogenation metal.

In yet another embodiment, the invention relates to a method for making ZSM-48 crystals which comprises: preparing an aqueous mixture of silica or silicate salt, alumina or aluminate salt, hexamethonium salt and alkali base wherein the mixture has the following molar ratios: silica:alumina from 70 to 110, base:silica from 0.1 to 0.3, preferably from 0.14 to 0.18 and hexamethonium salt:silica from 0.01 to 0.05, preferably from 0.015 to 0.025; heating the mixture with stirring for a time and temperature sufficient for crystal formation. Optionally, seed crystals of ZSM-48 can be added to the reaction mixture. The above procedure results in as-synthesized ZSM-48 crystals that contain the hexamethonium structure directing agent.

Hydroprocessing with ZSM-48 and Other High Productivity, Low Density Catalysts

The high productivity and/or low density catalysts according to the invention are suitable for hydroprocessing of hydrocarbon feedstocks. A preferred feedstock is a lube oil basestock. Such feedstocks are wax-containing feeds that boil in the lubricating oil range, typically having a 10% distillation point greater than 650° F. (343° C.), measured by ASTM D 86 or ASTM D2887, and are derived from mineral or synthetic sources. The feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

Feedstocks may have high contents of nitrogen- and sulfur-contaminants. Feeds containing up to 0.2 wt. % of nitrogen, based on feed and up to 3.0 wt. % of sulfur can be processed in the present process. Sulfur and nitrogen contents may be measured by standard ASTM methods D5453 and D4629, respectively.

In the invention, feedstocks are subjected to a series of hydroprocessing steps. For example, the feedstock may be hydrotreated, hydrofinished, or undergo aromatic saturation, and then be hydrodewaxed. Alternatively, the feedstock may be hydrodewaxed and then be hydrotreated, hydrofinished, or undergo aromatic saturation. The above treatment schemes can also be combined to produce a sequence, for example, of hydrotreating, hydrodewaxing, and hydrofinishing. The set of feedstocks includes both hydroprocessed feedstocks and Fischer-Tropsch waxes.

In an embodiment, a feedstock may be hydrotreated either prior to or after dewaxing. Hydrotreating conditions include temperatures of up to 426° C., preferably from 150 to 400° C., more preferably 200 to 350° C., a hydrogen partial pressure of from 1480 to 20786 kPa (200 to 3000 psig), preferably 2859 to 13891 kPa (400 to 2000 psig), a space velocity of from 0.1 to 10 hr.$^{-1}$, preferably 0.1 to 5 hr.$^{-1}$, and a hydrogen to feed ratio of from 89 to 1780 m$^3$/m$^3$ (500 to 10000 scf/B), preferably 178 to 890 m$^3$/m$^3$. Preferably, the hydrotreatment step is performed in the same reactor as the hydrodewaxing, with the same treat gas and at the same temperature. Preferably, stripping does not occur between the hydrotreatment and hydrodewaxing steps. Preferably, heat exchange does not occur between the hydrotreatment and hydrodewaxing steps, although heat may be removed from the reactor by a liquid or gas quench.

Alternatively, the feedstock may be hydrofinished or undergo aromatic saturation either before or after dewaxing. It is desirable to hydrofinish or saturate aromatics in the product resulting from dewaxing in order to adjust product qualities to desired specifications. Hydrofinishing and aromatic saturation are forms of mild hydrotreating directed to saturating any lube range olefins and residual aromatics as well as to removing any remaining heteroatoms and color bodies. The post dewaxing hydrofinishing or aromatic saturation is usually carried out in cascade with the dewaxing step. Generally the hydrofinishing or aromatic saturation will be carried out at temperatures from about 150° C. to 350° C., preferably 180° C. to 250° C. Total pressures are typically from 2859 to 20786 kPa (about 400 to 3000 psig). Liquid hourly space velocity is typically from 0.1 to 5 hr. $^{-1}$, preferably 0.5 to 3 hr. $^{-1}$ and hydrogen treat gas rates of from 44.5 to 1780 m$^3$/m$^3$ (250 to 10,000 scf/B). Preferably, the hydrofinishing or aromatic saturation step is performed in the same reactor as the hydrodewaxing, with the same treat gas and at the same temperature. Preferably, stripping does not occur between the hydrofinishing/aromatic saturation and hydrodewaxing steps. Preferably, heat exchange does not occur between the hydrofinishing/aromatic saturation and hydrodewaxing steps, although heat may be removed from the reactor by a liquid or gas quench.

Dewaxing conditions include temperatures of up to 426° C., preferably from 250-400° C., more preferably 275 to 350° C., pressures of from 791 to 20786 kPa (100 to 3000 psig), preferably 1480 to 17339 kPa (200 to 2500 psig), liquid hourly space velocities of from 0.1 to 10 hr.$^{-1}$, preferably 0.1 to 5 hr.$^{-1}$ and hydrogen treat gas rates from 45 to 1780 m$^3$/m$^3$ (250 to 10000 scf/B), preferably 89 to 890 m$^3$/m$^3$ (500 to 5000 scf/B).

Blocking of Feedstocks

In still another embodiment, high productivity catalysts can be used for "blocking" of feedstocks. Blocking of feedstocks refers to using a process train for processing of two or more feedstocks with distinct properties, without having to modify the catalyst or equipment in the process train. As an example, a process train containing a hydrotreating catalyst and a dewaxing catalyst can be used to hydroprocess a light neutral feed with a first wax content, such as 15%. In blocked operation, the same process train can be used to process a different feed, such as a feed with a wax content of 50% or more, without modifying the operating conditions of the process train. The flow rate of feedstock (LHSV), the catalyst, the hydrogen treat gas rate, the total H$_2$ partial pressure at the inlet of the reactor, and the process train remain the same. The temperature for processing the two different feeds differs by 35° C. or less, or by 30° C. or less, or by 20° C. or less, or 10° C. or less, or preferably the same temperature profile is used to process the two different feeds. While the cost benefits of block operation have previously been recognized, previous attempts at block operation have not been successful in producing high quality basestock products. Using the high productivity catalysts according to the invention, blocked operation of a process train can be used to process disparate feedstocks while maintaining high quality in the resulting basestocks.

EXAMPLES

Example 1

A mixture was prepared from 1200 g of water, 40 g of hexamethonium chloride (56% solution), 228 g of Ultrasil PM (a precipitated silica powder from Degussa), 12 g of sodium aluminate solution (45%), and 40 g of 50% sodium hydroxide solution. The mixture had the following molar composition:

SiO$_2$/Al$_2$O$_3$=106
H$_2$O/SiO$_2$=20.15
OH$^-$/SiO$_2$=0.17
Na$^+$/SiO$_2$=0.17
Template/SiO$_2$=0.023

The mixture was reacted at 320° F. (160° C.) in a 2-liter autoclave with stirring at 250 RPM for 48 hours. Those of skill in the art will recognize that factors such as the size of the autoclave and the type of stirring mechanism can make other stirring speeds and times desirable. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of crystals with mixed morphologies (needle-like and irregularly shaped crystals). The resulting ZSM-48 crystals had a SiO$_2$/Al$_2$O$_3$ molar ratio of ~100/1. FIG. 1 is a photomicrograph of the ZSM-48 crystals. This comparative example at template:silica ratio of 0.023 shows the presence of some needle-like crystals.

Example 2

A mixture was prepared from water, hexamethonium chloride (56% solution), Ultrasil PM, sodium aluminate solution (45%), and 50% sodium hydroxide solution. The prepared mixture had the following molar composition:

SiO$_2$/Al$_2$O$_3$=106
H$_2$O/SiO$_2$=20.15
OH$^-$/SiO$_2$=0.17
Na$^+$/SiO$_2$=0.17
Template/SiO$_2$=0.018

Figure 2:
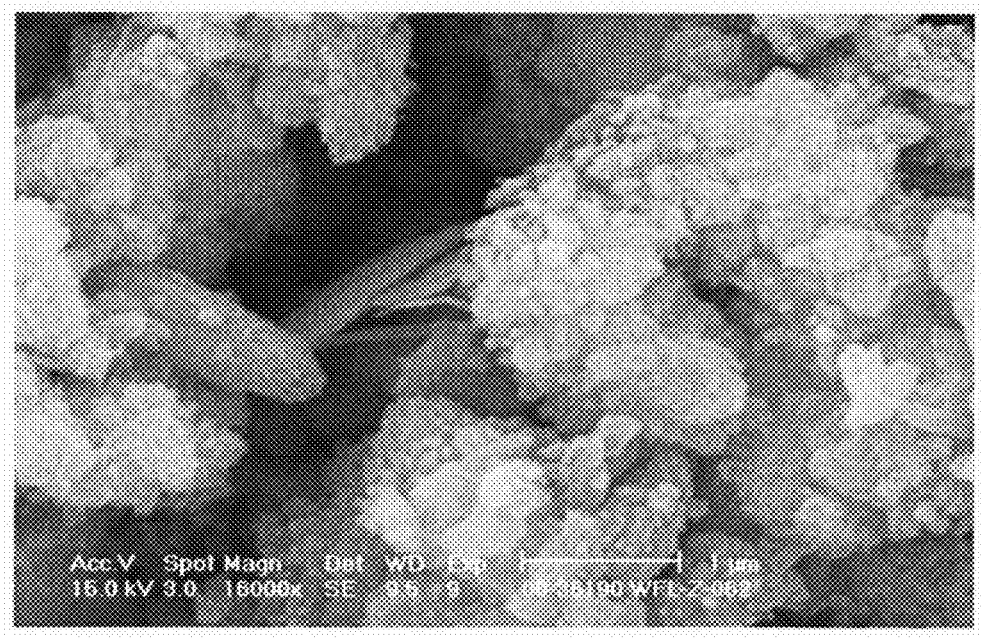
FIG. 2 is a photomicrograph showing the absence of needle-like crystals for ZSM-48 crystals prepared from a reaction mixture having a template:silica ratio of 0.018.

The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of small irregularly shaped crystals (with an average crystal size of about 0.05 microns). The resulting ZSM-48 crystals had a SiO$_2$/Al$_2$O$_3$ molar ratio of ~94/1. FIG. 2 is a photomicrograph of the resulting ZSM-crystals. FIG. 2 shows the absence of needle-like crystals for ZSM-48 according to the invention.

Example 3

A mixture was prepared from water, hexamethonium chloride (56% solution), Ultrasil Modified, sodium aluminate solution (45%), 50% sodium hydroxide solution, and 5 wt % (relative to the silica charge) of ZSM-48 seed crystals. The mixture had the following molar composition:

SiO$_2$/Al$_2$O$_3$=103
H$_2$O/SiO$_2$=14.8
OH$^-$/SiO$_2$=0.17
Na$^+$/SiO$_2$=0.17
Template/SiO$_2$=0.029

Figure 3:
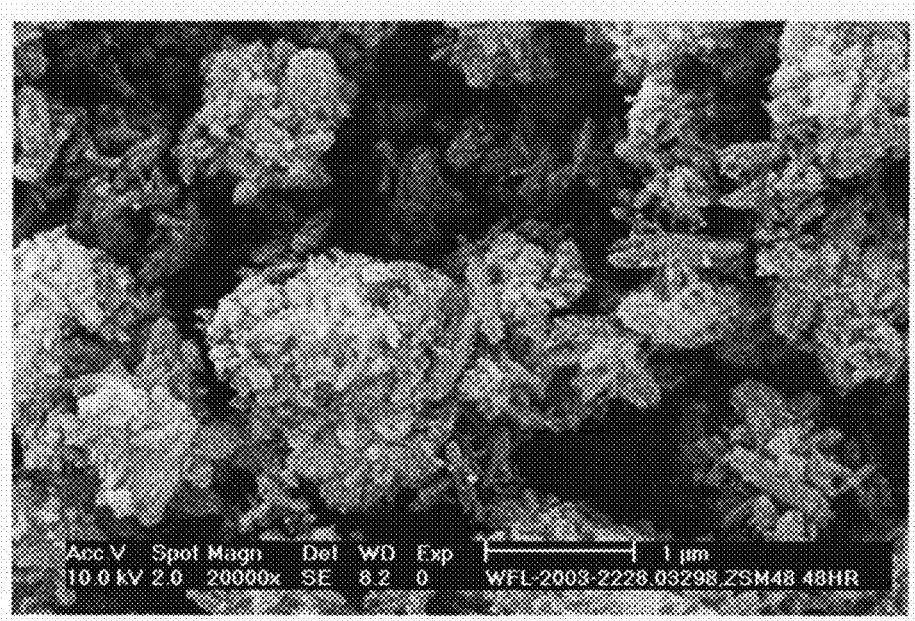
FIG. 3 is a photomicrograph showing the presence of needle-like crystals for ZSM-48 crystals prepared from a reaction mixture having a template:silica ratio of 0.029.

The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of elongated (needle-like) crystals (with an average crystal size of <1 microns). The resulting ZSM-48 crystals had a SiO$_2$/Al$_2$O$_3$ molar ratio of ~95/1. FIG. 3 is a photomicrograph of the resulting ZSM-crystals. This comparative example shows the presence of needle-like crystals for ZSM-48 synthesized from a reaction mixture having a template:silica ratio of 0.029.

Example 4

A mixture was prepared from water, hexamethonium chloride (56% solution), Ultrasil Modified, sodium aluminate solution (45%), 50% sodium hydroxide solution, and 5 wt % (relative to the silica charge) of ZSM-48 seed crystals. The mixture had the following molar composition:

SiO$_2$/Al$_2$O$_3$=103
H$_2$O/SiO$_2$=14.7
OH$^-$/SiO$_2$=0.17
Na$^+$/SiO$_2$=0.17
Template/SiO$_2$ 0.019

Figure 4:
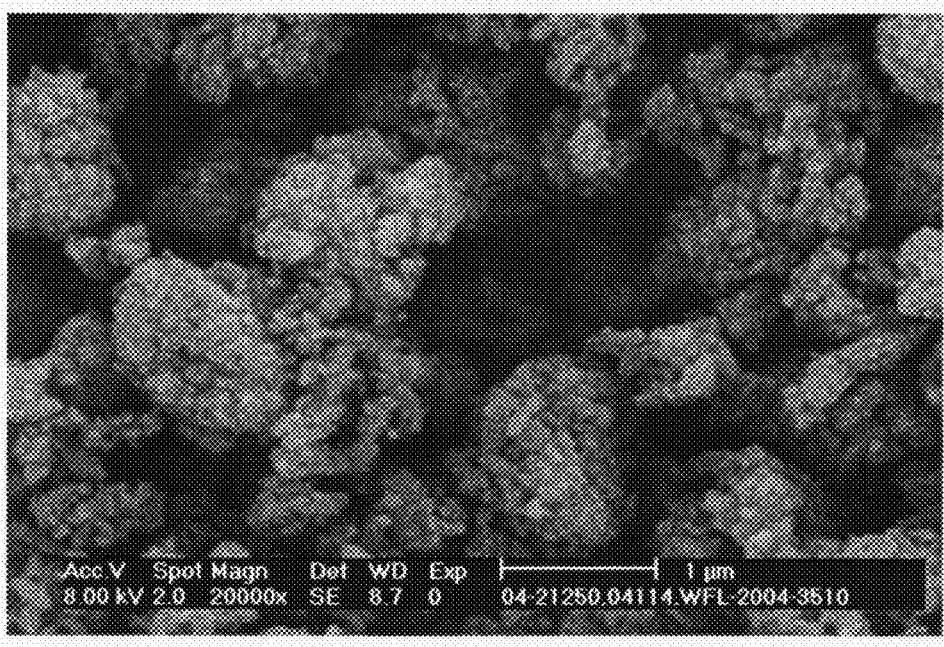
FIG. 4 is a photomicrograph showing the absence of needle-like crystals for ZSM-48 crystals prepared from a reaction mixture having a template:silica ratio of 0.019.

The mixture was reacted at 320° F. (160° C.) in an autoclave with stirring at 250 RPM for 24 hours. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of small irregularly shaped crystals (with an average crystal size of about 0.05 microns). The resulting ZSM-48 crystals had a SiO$_2$/Al$_2$O$_3$ molar ratio of 89. FIG. 4 is a photomicrograph of the resulting ZSM-crystals. This example of ZSM-48 crystals according to the invention shows the absence of needle-like crystals.

Example 5

A mixture was prepared from water, hexamethonium chloride (56% solution), Ultrasil Modified, sodium aluminate solution (45%), 50% sodium hydroxide solution, and 3.5 wt % (relative to the silica charge) of ZSM-48 seed crystals. The mixture had the following molar composition:

$SiO_2/Al_2O_3=103$
$H_2O/SiO_2=14.6$
$OH^-/SiO_2=0.17$
$Na^+/SiO_2=0.17$
$Template/SiO_2=0.015$ The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the mixture of ZSM-48 and trace of Kenyaite impurity.

Example 6

A mixture was prepared from water, hexamethonium chloride (56% solution), Ultrasil Modified, sodium aluminate solution (45%), 50% sodium hydroxide solution, and 3.5 wt % (relative to the silica charge) of ZSM-48 seed crystals. The mixture had the following molar composition:

$SiO_2/Al_2O_3=102.4$
$H_2O/SiO_2=14.8$
$OH^-/SiO_2=0.20$
$Na^+/SiO_2=0.20$
$Template/SiO_2=0.019$ The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material synthesized from a reaction mixture having a base:silica ratio of 0.20 showed the mixture of ZSM-48 and Kenyaite impurity.

Example 7

A mixture was prepared from water, hexamethonium chloride (56% solution), Ultrasil PM, sodium aluminate solution (45%), 50% sodium hydroxide solution, and 3.5 wt % (relative to the silica charge) of ZSM-48 seed crystals. The mixture had the following molar composition:

$SiO_2/Al_2O_3=102.4$
$H_2O/SiO_2=14.8$
$OH^-/SiO_2=0.15$
$Na^+/SiO_2=0.15$
$Template/SiO_2=0.019$ The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology.

Example 8

A mixture was prepared from water, hexamethonium chloride (56% solution), Ultrasil PM, sodium aluminate solution (45%), and 50% sodium hydroxide solution. The mixture had the following molar composition:

$SiO_2/Al_2O_3=90$
$H_2O/SiO_2=20.1$
$OH^-/SiO_2=0.17$
$Na^+/SiO_2=0.17$
$Template/SiO_2=0.025$ The mixture was reacted at 320° F. (160° C.) in an autoclave with stirring at 250 RPM for 48 hours. The product was filtered, washed with deionized (DI) water and dried at 250° F. (120° C.). The XRD pattern of the as-synthesized material showed the typical ZSM-48 topology and a trace of ZSM-50 impurity was identified. The product showed the presence of some needle-like morphology.

Example 9

65 parts (basis: calcined 538° C.) of high activity ZSM-48 crystal (Example #4) were mixed with 35 parts of pseudo-boehmite alumina (basis: calcined 538° C.) in a Simpson muller. Sufficient water was added to produce an extrudable paste on a 2" Bonnot extruder. The mix of ZSM-48, pseudo-boehmite alumina, and water containing paste was extruded and dried in a hotpack oven at 121° C. overnight. The dried extrudate was calcined in nitrogen @ 538° C. to decompose and remove the organic template. The $N_2$ calcined extrudate was humidified with saturated air and exchanged with 1 N ammonium nitrate to remove sodium (spec: <500 ppm Na). After ammonium nitrate exchange, the extrudate was washed with deionized water to remove residual nitrate ions prior to drying. The ammonium exchanged extrudate was dried at 121° C. overnight and calcined in air at 538° C. After air calcination, the extrudate was steamed for 3 hrs @ 900° F. The steamed extrudate was impregnated with tetrammine platinum nitrate (0.6 wt % Pt) using incipient wetness. After impregnation, the extrudate was dried overnight at 250° F. and calcined in air at 360° C. to convert the tetrammine nitrate salt to platinum oxide.

Example 10

Figure 5:
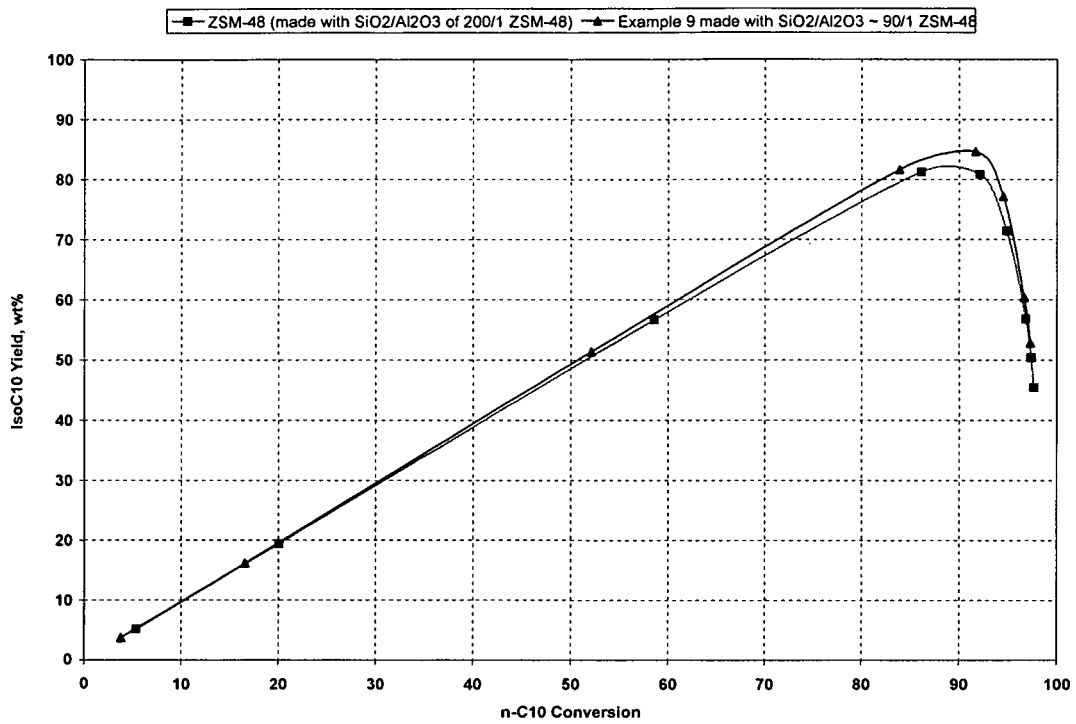
FIG. 5 is a graph showing iso-C10 yield as a function of n-C10 conversion.

The dewaxing catalyst of Example 9 was tested in a n-$C_{10}$ hydroisomerization test. Catalyst temperatures were varied from 162 to 257° C. under flowing $H_2$ (100 sccm) at 1 atm pressure to adjust n-$C_{10}$ conversions from 0 to 95%+. The high activity ZSM-48 containing catalyst showed excellent iso-$C_{10}$ yields with minimal cracking as a function of n-$C_{10}$ conversion and reaction temperature. FIG. 5 is a graph showing iso-$C_{10}$ yield as a function of n-$C_{10}$ conversion for a catalyst according to an embodiment of the invention and a catalyst with a silica:alumina ratio of about 200.

Example 11

This example relates to the preparation of HA-ZSM-48 with seeding with regular ZSM-48 crystals. A mixture was prepared using water, hexamethonium chloride (56% solution), Ultrasil PM, sodium aluminate solution (45%), and 50% sodium hydroxide solution. About 5 wt % (relative to the silica charge) of ZSM-48 seed was then added the mixture. The mixture had the following molar composition:

$SiO_2/Al_2O_3=103$
$H_2O/SiO_2=14.7$
$OH^-/SiO_2=0.17$
$Na^+/SiO_2=0.17$
$Template/SiO_2=0.019$ The mixture was reacted at 320° F. (160° C.) in an autoclave with stirring at 250 RPM for 24 hours. The product was filtered, washed with deionized (DI) water and dried at 250°

F. (120° C.). The XRD pattern of the as-synthesized material shows pure phase of ZSM-48 topology. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of ~88.5/1.

Example 12

This example shows the preparation of ZSM-48 with seeding using 5 wt. % (relative to the silica charge) of Beta crystals. Heterostructural seeding using Beta crystals is described in U.S. Pat. No. 6,923,949. A mixture was prepared from 1000 g of water, 25 g of hexamethonium chloride (56% solution), 190 g of Ultrasil PM (a precipitated silica powder produced from Degussa), 10 g of sodium aluminate solution (45%), and 33.3 g of 50% sodium hydroxide solution. The 10 g of Beta seed ($SiO_2/Al_2O_3$~35/1) was then added the mixture. The mixture had the following molar composition:

$SiO_2/Al_2O_3$=106
$H_2O/SiO_2$=20
$OH^-/SiO_2$=0.17
$Na^+/SiO_2$=0.17
Template/$SiO_2$=0.018

The mixture was reacted at 320° F. (160° C.) in a 2 liter autoclave with stirring at 250 RPM for 48 hours. The product was filtered, washed with deionized (DI) water and dried at 250° F. (120° C.). The XRD pattern of the as-synthesized material shows pure phase of ZSM-48 topology. Clearly, no Beta phase was observed on XRD pattern of the synthesized product. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of ~87.2.

Example 13

This example shows the preparation of ZSM-48 using seeding with 10 wt. % (relative to the silica charge) of Beta seeds. The same reactants, formulation, and procedure as Example 2 were used, except that double amount of Beta crystals was added as seeding agent. The XRD pattern of the as-synthesized material shows pure phase of ZSM-48 topology. Clearly, no Beta phase was observed on XRD pattern of the synthesized product. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of ~80/1.

Example 14

The products from Examples 11-13 were tested using a hexane adsorption test. The hexane adsorption test is a measure of the pore volume of any given catalyst. The calcined catalysts prepared as above were heated in a thermogravimetric analyzer (TGA) under nitrogen at 500° C. for 30 min. The dried catalyst was then cooled to 90° C. and exposed to n-hexane at a partial pressure of 75 torr. The weight changes as n-hexane uptake were measured by micro balance in the TGA instrument. An Alpha value was also determined for each crystal. The Alpha value for a catalyst is a standardized measure of the catalyst activity relative to the activity of a reference catalyst. The results are summarized in Table 1.

TABLE 1

| SAMPLE | n-Hexane (mg/g) | Estimated % Beta in product | Alpha Value |
|---|---|---|---|
| Example 11: HA-ZSM-48 reaction seeded with ZSM-48 crystals | 37.7 | 0 | 70 |
| Example 12: HA-ZSM-48 reaction seeded with ~5% (to silica charged) of Beta seed | 42.4 | ~5.3 | ~125 |
| Example 13: HA-ZSM-48 reaction seeded with ~10% (to silica charged) of Beta seed | 48.3 | ~12 | 180 |
| Beta seed crystals used in Examples 12 & 13 | 126 | 100 | 690 |

Based on the data shown in Table 1, the added Beta seed crystals were not dissolved in the crystallization and remained in the synthesized product. The conclusion was supported by the increasing adsorption data of n-hexane on Examples 12 & 13. The conclusion is also supported by the increasing alpha value of the catalysts as the weight percentage of beta in the crystals increases. The n-hexane adsorption and alpha value increases demonstrate that the ZSM-48 crystals with a heterogeneous seed have a different reactivity than the ZSM-48 crystals with a homogeneous seed.

Note that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 $sec^{-1}$). The Alpha Test is conventionally known, and is described, for example, in U.S. Pat. No. 3,354,078; in the Journal of Catalysis, vol. 4, p. 527 (1965); vol. 6, p. 278 (1966); and vol. 61, p. 395 (1980).

Example 15

Figure 6:
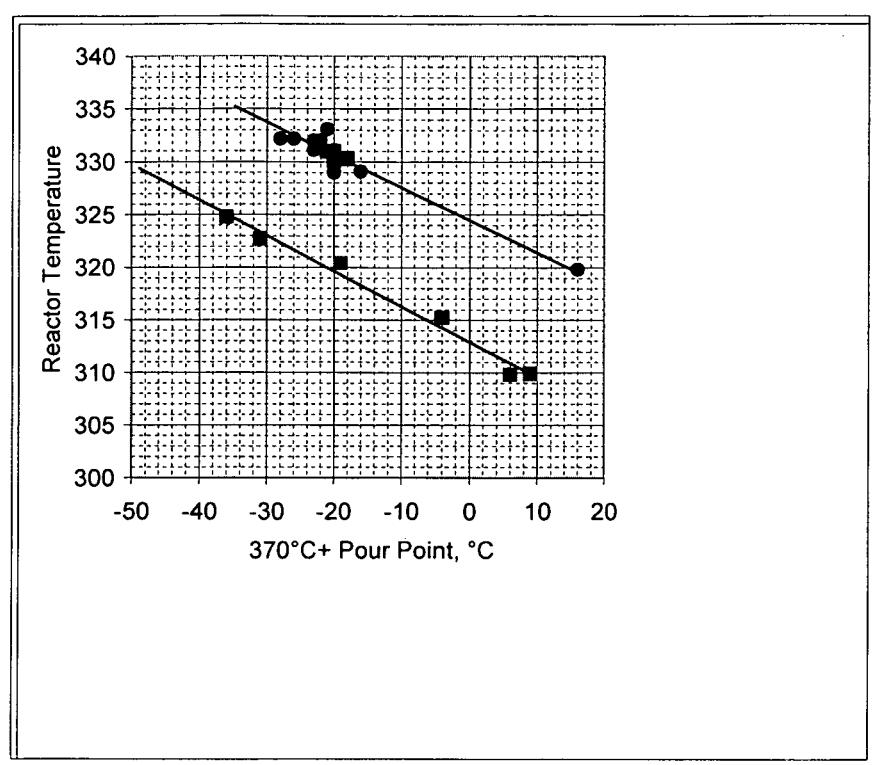
FIG. 6 is a graph showing reactor temperature vs. required temperature to meet the 370° C.+pour point.

This example compares the activity credit for ZSM-48 according to the invention relative to a ZSM-48 with a higher silica:alumina ratio. A 600N slack wax was dewaxed at 1000 psig (6996 kPa), LHSV of 1.0 l/hr and treat gas rate of 2500 scf/B (445 $m^3/m^3$). FIG. 6 is a graph showing reactor temperature vs. required temperature to meet the 370° C.+pour point. In FIG. 6, the difference between the upper line (representing ZSM-48 with a higher silica:alumina ratio) and the lower line (ZSM-48 with a lower silica:aluminum ratio) represents the activity credit.

Example 16

Figure 7:
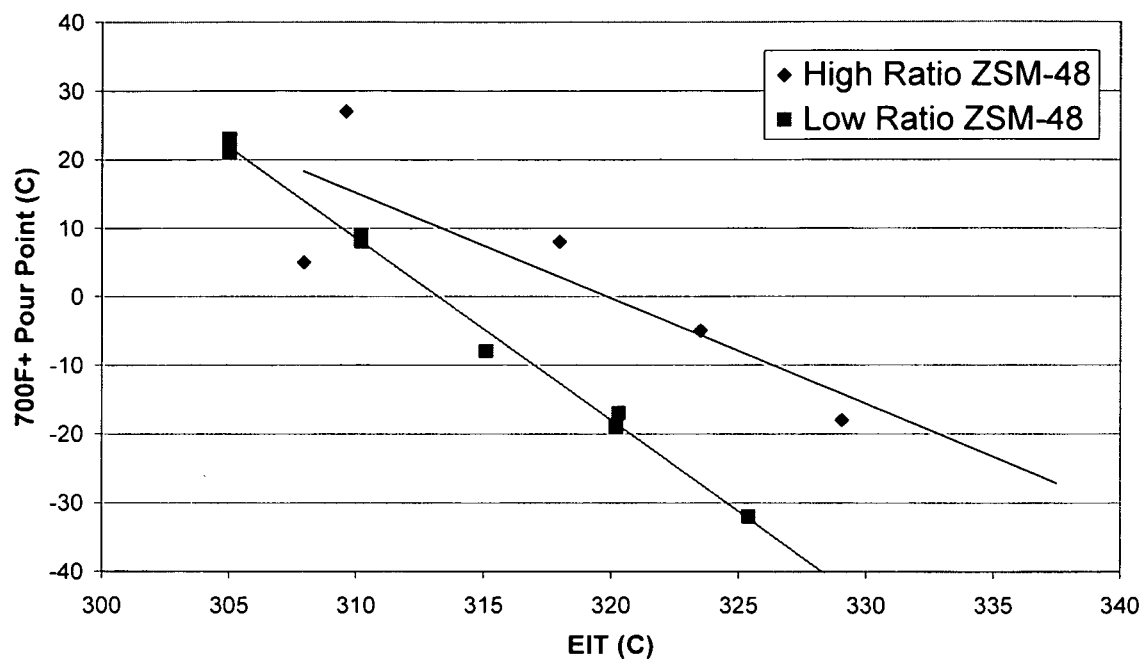
FIG. 7 is another graph showing reactor temperature vs. required temperature to meet a 370° C.+pour point.
Figure 8:
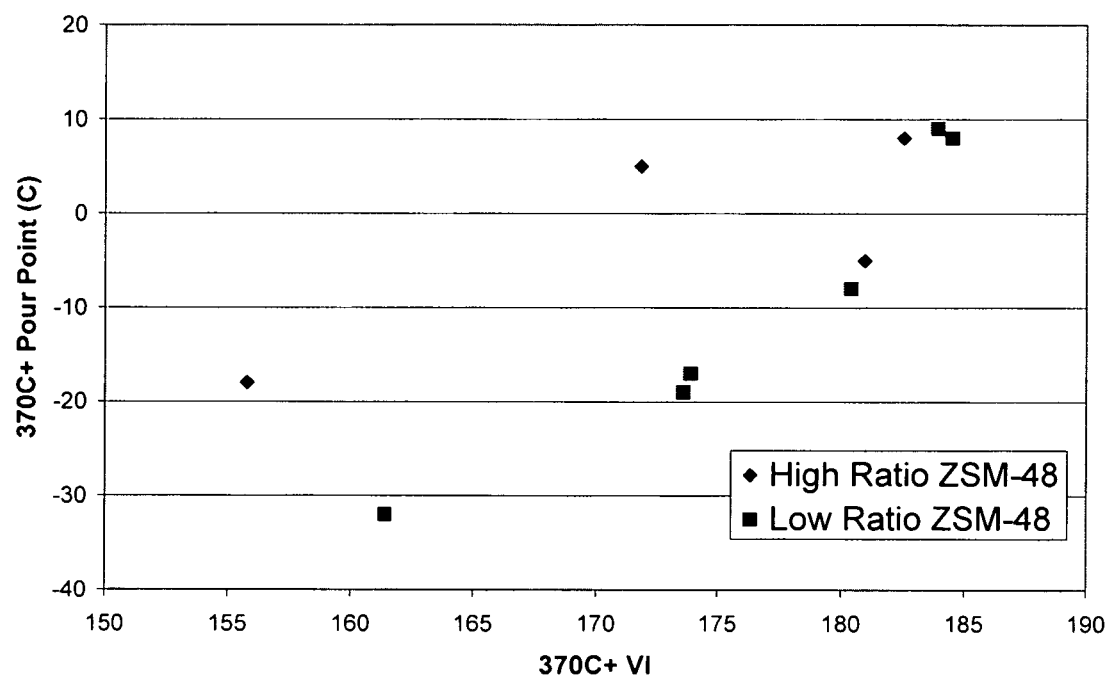
FIG. 8 is a graph showing pour point versus viscosity index for a feedstock hydroprocessed with low ratio and high ratio ZSM-48.

This example shows the distinction between a version of ZSM-48 which has a $SiO_2:Al_2O_3$ ratio of less than 110, and a version of ZSM-48 which has a $SiO_2:Al_2O_3$ ratio of greater than 110. These two versions of ZSM-48 can be referred to as low ratio and high ratio ZSM-48. FIG. 7 shows pour point versus temperature for low ratio and high ratio ZSM-48. As shown in FIG. 7, the low ratio ZSM-48 has a noticeably lower pour point at typical hydroprocessing temperatures of more than 300C. Note that the temperature for the bottom axis is an Estimated Internal Temperature. The benefits of the low ratio ZSM-48 are further shown in FIG. 8, which depicts pour point versus viscosity index (VI) for the 370C+fractions generated from a processed feedstock. In FIG. 8, low ratio ZSM-48 is capable of achieving more favorable combinations of pour point and VI.

Example 17

Low Density, High Activity MCM-41 followed by Low Density, High Activity Pt ZSM-48

FIGS. 9 and 10 show examples of feedstock that have been hydroprocessed by first exposing the feedstock to an aromatic saturation catalyst and then to a dewaxing catalyst. For aromatic saturation, one of the two catalysts used was a commercially available catalyst having 0.3 wt % Pt and 0.9 wt % Pd supported on silica and/or alumina. The other catalyst shown is a low density version of alumina bound MCM-41 impregnated with 0.3 wt % Pt and 0.9 wt % Pd. This alumina bound MCM-41 has a density of less than 550 kg/m$^3$. For hydrodewaxing, two types of Pt-ZSM-48 catalysts are shown. One type of Pt-ZSM-48 has a SiO$_2$:Al$_2$O$_3$ of greater than 110. The other type has a SiO$_2$:Al$_2$O$_3$ ratio in the catalyst between about 70:1 and about 110:1. The low ratio silica:alumina ZSM-48 was formed without using a heterogeneous seed. In FIGS. 9 and 10, Process A refers to processing a feedstock using a commercial Pt/Pd on silica and/or alumina catalyst followed by high ratio Pt-ZSM-48. Process B refers to processing a feedstock using Pt/Pd on alumina bound MCM-41 followed by low ratio Pt-ZSM-48. Process C refer to processing a feedstock using a commercial Pt/Pd on silica and/or alumina catalyst followed by low ratio Pt-ZSM-48.

FIG. 9 shows the performance for various combinations of catalysts operating on a 150N hydrocracked feedstock. FIG. 9 shows the combinations of pour point and viscosity index that can be achieved at various operating temperatures. For a 150N feedstock, alumina bound MCM-41 followed by low ratio Pt-ZSM-48 (with less than a 110 SiO$_2$:Al$_2$O$_3$ ratio) shows on average the lowest combinations of values for pour point and viscosity index. This trend is more pronounced in FIG. 10, which shows pour point and viscosity index for processing of a 500N hydrocracked feedstock.

Example 18

FIGS. 11 and 12 provide further evidence regarding the benefits of a low density, high activity catalyst such as alumina bound or titania bound MCM-41. FIG. 11 shows data for various 150N hydrocracked feedstocks after dewaxing with a SiO$_2$:Al$_2$O$_3$ ratio of 70 to 110 at a given temperature. FIG. 12 shows similar data for 500N hydrocracked feeds. In FIGS. 11 and 12, each of the dewaxed feedstocks is further exposed to an aromatic saturation or hydrofinishing catalyst, as specified in the Figure. Two types of commercial catalysts having Pt and Pd supported on alumina are shown. One of the catalysts is composed of 0.3 wt % Pt and 0.9 wt % Pd on a silica and/or alumina support. A "high metal" version of this catalyst is also included that has roughly twice as much Pt and Pd on a silica and/or alumina support. Two types of MCM-41 catalysts are also shown, an alumina-bound version and a titanium-bound version. The MCM-41 catalysts include 0.3 wt % of Pt and 0.9 wt % of Pd.

In FIG. 11, the MCM-41 catalysts show improved results for aromatic saturation versus the 0.3 wt % Pt/0.9 wt % Pd on alumina catalyst for all temperatures above 300 C, and comparable results below 300 C. The much higher metal content of the 0.6 wt % Pt/1.8 wt % Pd on alumina catalyst shows comparable results to the MCM-41 catalysts above 300 C. The improvement achieved by using MCM-41 is more pronounced in FIG. 12.

In addition to providing comparable or improved reactivity, the MCM-41 catalysts used for the experiments shown in FIGS. 11 and 12 have significantly reduced metal content, due to the lower density of the MCM-41 support. The metals content of the MCM-41 catalysts is also lower than the high metal content commercial catalyst shown in FIGS. 11 and 12. As a result, the use of a MCM-41 catalyst in place of a conventional alumina bound commercial catalyst allows for substantial cost savings during a catalyst load operation.

Example 19

Blocked Operation

The current invention as described utilizes high activity hydroisomerization catalysts such as ZSM-48 that have sufficient activity to allow the processing of feeds with large differences in wax content in the same unit. Furthermore such excess activity can be used to process higher nitrogen containing feeds in combination with the higher wax contents. Because lower operating temperatures are possible with this invention, lower dry gas makes are achieved which in turns simplified equipment design.

The invention uses a ZSM-48 catalyst system with zeolite ranges between 40 and 80% and group VIII metals alone or in combination with a range between 0.3 to 1.5 wt % and less than 110 to 1 silica to alumina ratio. A preferred range is zeolite content between 50 and 70% with Pt between 0.3 and 0.8% and SiO$_2$/Al$_2$O$_3$ ratio below 110 to 1.

In an embodiment, the invention can be used to process feedstocks with widely varying wax contents in the same process train while maintaining desired product characteristics. Preferably, the temperature during the hydrodewaxing process step for both of the feedstocks is 365° C. or lower. For example, the method of the invention can be used to hydroprocess a first feedstock having a first wax content. A second feedstock having a second wax content can then be processed without modifying the configuration of the process train. In particular, the catalyst used during the hydroisomerization process is the same for both processes. In embodiments where additional hydroprocessing steps are used, preferably the catalysts for the additional hydroprocessing steps are also kept the same.

In an embodiment, the first wax content can differ from the second wax content by at least 15%, or at least 20%, or at least 25%, or at least 30%. In another embodiment, the first wax content can differ from the second wax content by 80% or less, or 75% or less, or 70% or less, or 60% or less, or 50% or less. Preferably, each feedstock has a wax content of at least 10%, or at least 15%, or at least 20%.

In an embodiment, both feedstocks have a pour point after the hydroisomerization treatment of −10° C. or less, or −12° C. or less, or −15° C. or less, or −18° C. or less, or −20° C. or less. In another embodiment, the pour point of both feedstocks after the hydroisomerization treatment is at least −50° C., or at least −40° C., or at least −30° C.

In an embodiment, the temperature of the hydroisomerization process for both feedstocks is 365° C. or less, or 360° C. or less, or 350° C. or less. The temperature for processing of the first feedstock is preferably within 35° C. of the temperature of the second feedstock, or within 30° C., or within 20° C., or within 10° C. Alternatively, the temperature profile for processing the two feedstocks is the same. In an embodiment, the dry gas make in the hydroisomerization process of each feedstock is 5% or less, or 4% or less, or 3% or less, or 2% or less.

In still another embodiment, the feedstocks can be characterized with respect to a selected catalyst, such as characterizing the feedstocks based on the processing temperature required to achieve a desired pour point when performing a hydroisomerization process using a specified catalyst. For example, feedstocks can be classified relative to the hydroisomerization temperature needed to achieve a desired property, such as pour point, when using a specified catalyst, such as Pt-ZSM-48. In an embodiment, feedstocks can be classified as requiring a hydroisomerization temperature of at least 285° C. but less than 315° C., or at least 315° C. but less than 340° C., or at least 340° C. but less than 365° C. in order to reach a pour point of −15° C. For convenience, each of these classifications can be referred to as a ZSM-48 processing class.

In such an embodiment, feedstocks from different classes can be processed in a process train by changing only the temperature of operation. For example, a feedstock classified as needing a temperature between 285° C. and 315° C. can be processed in a process train. The temperature in the process train can then be increased, and feedstock from the 315° C. to 345° C. class can be processed.

In the data presented in the following Tables A, B, and C, a low density, high activity dewaxing catalyst (Pt-ZSM-48 with a silica to alumina ratio between 70 and 110) was used for hydrodewaxing after an initial hydrotreatment with a conventional hydrotreating catalyst having Pt/Pd on alumina. The hydrotreating catalyst represented about 15% of the catalyst volume. Table A provides the feed characteristics for four different feed types. Table B details the hydroisomerization conditions used for each feed type. Table C shows the product inspections for both a heavy lube and light lube product resulting from treating the feedstock under the specified hydroisomerization conditions.

TABLE A

| Feed Types | Light Neutral Slack Wax | Heavy Neutral Slack Wax | LN Hydrocrackate | HN Hydrocrackate |
|---|---|---|---|---|
| Feed density ASTM-287 | 0.811 | 0.820 | 0.839 | 0.845 |
| Wax yield D3235 | 94 | 87 | 20 | 20 |
| Sulfur, ppm | 5 | 5 | 10 | 10 |
| Nitrogen, ppm | 1 | 1 | 1 | 1 |

TABLE B

| Hydroisomerization Conditions | | | | |
|---|---|---|---|---|
| WABT, deg C. | 351 | 346 | 316 | 315 |
| LHSV[(1)] | 1.0 | 1.0 | 1.0 | 1.0 |
| H2 circulation, Nm3/m3 | 419 | 419 | 419 | 419 |
| Pressure, kg/cm2 | 107 | 107 | 107 | 107 |
| 370 deg C. conversion | 43 | 32.5 | 7.2 | 6.8 |

[(1)]includes 15% Pt/Pd on alumina HDT catalyst on top

TABLE C

| Product Inspections - Heavy Lube | | | | |
|---|---|---|---|---|
| Pour point, deg C. | −24 | −18 | −18 | −15 |
| VI | 141.7 | 142.8 | 131 | 131.7 |
| Yield, wt % | 38.1 | 54.6 | 70.5 | 82.8 |
| Noack, wt % (estimated) | 15 | 4.3 | 15 | 6.5 |
| Product Inspections - Light Lube | | | | |
| Pour point, deg C. | −34 | −33 | −28 | −28 |
| VI | 125.7 | 117.8 | 119 | 111 |
| Yield, wt % | 26.3 | 13.6 | 6.8 | 5.8 |
| Total lube yield, wt % | 64.4 | 68.2 | 77.3 | 88.6 |
| Dry gas, wt % | 3.14 | 2.29 | 0.60 | 0.53 |

In the above example, by comparing the required temperatures for reaction (hydroisomerization) verses wax content, it can be seen that both light neutral (LN) slack wax and LN hydrocrackate required about a 0.47° C. reactor temperature increase per 1% increase of wax in feed. This is an improvement over conventional techniques, where a reactor temperature increase of 0.65° C. or higher is required to accommodate each 1% increase of wax in feed. The smaller reactor temperature increase for processing higher wax feeds, as demonstrated in the Tables above, means that lower operating temperatures can be used for processing higher wax containing feeds. The above Tables also show substantially lower gas makes, due in part to catalyst type and in part to the lower temperature requirements. This allows for improved yield when processing high wax feeds. Due to the improved processing characteristics of the inventive process, even higher wax contents up to 100% are possible, such as processing of GTL type stocks.

What is claimed is:

1. A method for producing a lube basestock, comprising:
    exposing a hydrocracked feedstock to a first catalyst, said first catalyst comprising at least one Group VIII metal supported on a MCM-41 catalyst support having pore sizes from 15 to 100 Angstroms and having a density of 600 kg/m$^3$ or less, under effective conditions for treating the feedstock, said effective conditions being effective for hydrofinishing or aromatic saturation; and
    exposing the treated feedstock to a second catalyst comprising ZSM-48 having a SiO$_2$:Al$_2$O$_3$ ratio of 95 or less and a metal hydrogenation component under conditions effective for dewaxing the treated feedstock, the ZSM-48 being free of non-ZSM-48 seed crystals, wherein the ZSM-48 crystals are free of crystals having a needle-like morphology.

2. The method of claim 1, wherein the first catalyst has a density of 550 kg/m$^3$ or less.

3. The method of claim 1, wherein the first catalyst has a density of 500 kg/m$^3$ or less.

4. The method of claim 1, wherein the first catalyst comprises at least one Group VIII metal selected from Pt, Pd, and mixtures thereof.

5. The method of claim 4, wherein the first catalyst comprises at least 0.5 wt % of the at least one Group VIII metal.

6. The method of claim 1, further comprising exposing the dewaxed, treated feedstock to a third catalyst under conditions effective for hydrofinishing or aromatic saturation, said third catalyst having a density of 600 kg/m$^3$ or less.

7. The method of claim 6, wherein the third catalyst comprises MCM-41.

8. The method of claims 6, wherein the third catalyst has a density of 550 kg/m$^3$ or less.

9. The method of any of claims 6, wherein the third catalyst comprises at least one Group VIII metal selected from Pt, Pd, and mixtures thereof.

10. The method of any of claims 6, wherein the third catalyst comprises at least 0.5 wt % of the at least one Group VIII metal.

* * * * *